United States Patent
Moskowitz et al.

(10) Patent No.: US 6,316,911 B1
(45) Date of Patent: Nov. 13, 2001

(54) BATTERY AND FLASHLIGHT RECHARGER

(75) Inventors: Charles M. Moskowitz, Owings Mills; Roger Q. Smith, Reisterstown, both of MD (US)

(73) Assignee: Black & Decker Inc., Newark, DE (US)

(*) Notice: Subject to any disclaimer, the term of this patent is extended or adjusted under 35 U.S.C. 154(b) by 224 days.

(21) Appl. No.: 08/907,859

(22) Filed: Aug. 8, 1997

(51) Int. Cl.[7] .................................................. H02J 7/00
(52) U.S. Cl. .......................... 320/114; 320/DIG. 34; 320/110
(58) Field of Search ................................ 362/183; 307/66; 320/110, 111–115, DIG. 34, DIG. 35

(56) References Cited

U.S. PATENT DOCUMENTS

| | | | |
|---|---|---|---|
| D. 153,282 | 4/1949 | Haas | D26/49 |
| D. 282,289 | 1/1986 | Verdier | D26/46 |
| 2,236,338 | 3/1941 | Emanuel | 362/183 |
| 2,293,284 | 8/1942 | Emanuel | 362/183 |
| 3,217,156 | 11/1965 | Sherwood | 362/183 |
| 3,217,224 | 11/1965 | Sherwood | 320/115 |
| 3,225,155 | 12/1965 | Duncan | 200/51.09 |
| 3,261,973 | 7/1966 | Kott | 362/183 |
| 3,264,545 | 8/1966 | Kott | 320/114 |
| 3,517,185 | 6/1970 | Moore et al. | 362/183 |
| 3,521,050 | 7/1970 | Shagena, Jr. | 362/183 |
| 3,825,740 | 7/1974 | Friedman et al. | 362/183 |
| 3,890,555 | 6/1975 | Nelson et al. | 320/165 |
| 3,976,986 | 8/1976 | Zabroski | 340/656 |
| 4,029,954 | 6/1977 | Moyer | 362/183 |
| 4,150,302 | 4/1979 | Roche | 307/66 |
| 4,340,823 | 7/1982 | Miyazawa | 307/66 |
| 4,388,673 | 6/1983 | Maglica | 362/183 |
| 4,441,066 | 4/1984 | Burmenko | 320/165 |
| 4,467,263 | 8/1984 | Conforti et al. | 320/111 |
| 4,563,629 | 1/1986 | Keiper | 320/134 |
| 4,591,777 | 5/1986 | McCarty et al. | 320/110 |
| 4,605,993 | 8/1986 | Zelina, Jr. | 362/183 |
| 4,647,831 | 3/1987 | O'Malley et al. | 320/110 |
| 4,739,242 | 4/1988 | McCarty et al. | 320/110 |
| 4,749,908 | 6/1988 | Stifter | 315/86 |
| 4,764,853 | 8/1988 | Thomas et al. | 362/183 |
| 4,843,298 | 6/1989 | Brauch et al. | 320/115 |

(List continued on next page.)

FOREIGN PATENT DOCUMENTS

| | | |
|---|---|---|
| 7522476 | 7/1975 | (DE) . |
| 26 18 748 A1 | 11/1977 | (DE) . |
| 32 09 684 A1 | 9/1983 | (DE) . |
| 41 38 710 A1 | 5/1993 | (DE) . |
| 196 20 834 C1 | 6/1997 | (DE) . |
| 0 103 124 A2 | 3/1984 | (EP) . |
| 0 246 336 B1 | 7/1990 | (EP) . |
| 0 313 285 B1 | 2/1994 | (EP) . |
| 0 427 042 B1 | 12/1994 | (EP) . |
| 0 768 724 A2 | 4/1997 | (EP) . |
| 0 768 724 A3 | 4/1997 | (EP) . |
| 0 679 237 B1 | 9/1997 | (EP) . |
| 2 028 025 | 2/1980 | (GB) . |
| 1-209929 | 8/1989 | (JP) . |

*Primary Examiner*—Peter S. Wong
*Assistant Examiner*—Gregory J. Toatley, Jr.
(74) *Attorney, Agent, or Firm*—Harness, Dickey & Pierce, P.L.C.

(57) ABSTRACT

A recharger system for charging a stand alone battery and a flashlight battery has a housing to receive a flashlight as well as a stand alone battery. The charger and flashlight include circuitry which enable the stand alone battery as well as the flashlight battery to be charged at the same time. When the stand alone battery or flashlight battery or both are charging, indicator LEDS are illuminated. If the power is lost or an outage occurs, an additional indicator LED is illuminated, which is powered from the stand alone battery, and ,if the flashlight is in the housing, the bulb of the flashlight is also illuminated, being powered through the flashlight battery.

16 Claims, 3 Drawing Sheets

U.S. PATENT DOCUMENTS

| | | | |
|---|---|---|---|
| 4,857,702 | 8/1989 | Cafaro | 219/225 |
| 4,934,020 | 6/1990 | Jackson | 15/339 |
| 5,010,454 | 4/1991 | Hopper | 362/61 |
| 5,138,245 | 8/1992 | Mattinger et al. | 320/115 |
| 5,165,048 | 11/1992 | Keller et al. | 320/113 |
| 5,396,162 | 3/1995 | Brilmyer | 320/114 |
| 5,410,237 | 4/1995 | Sharrah et al. | 320/115 |
| 5,432,689 | 7/1995 | Sharrah et al. | 362/184 |
| 5,467,258 | 11/1995 | Bamber et al. | 362/184 |
| 5,523,669 | 6/1996 | Oku et al. | 320/160 |
| 5,525,888 | 6/1996 | Toya | 320/111 |
| 5,525,889 | 6/1996 | Chan et al. | 173/217 |
| 5,578,875 * | 11/1996 | Dormer et al. | 307/66 |
| 5,587,645 | 12/1996 | Sciammarella et al. | 362/253 |

* cited by examiner

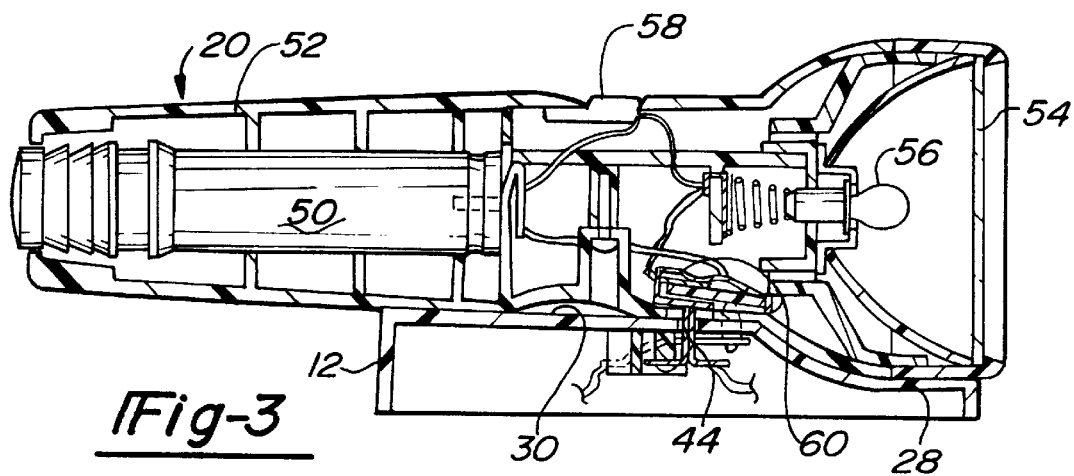
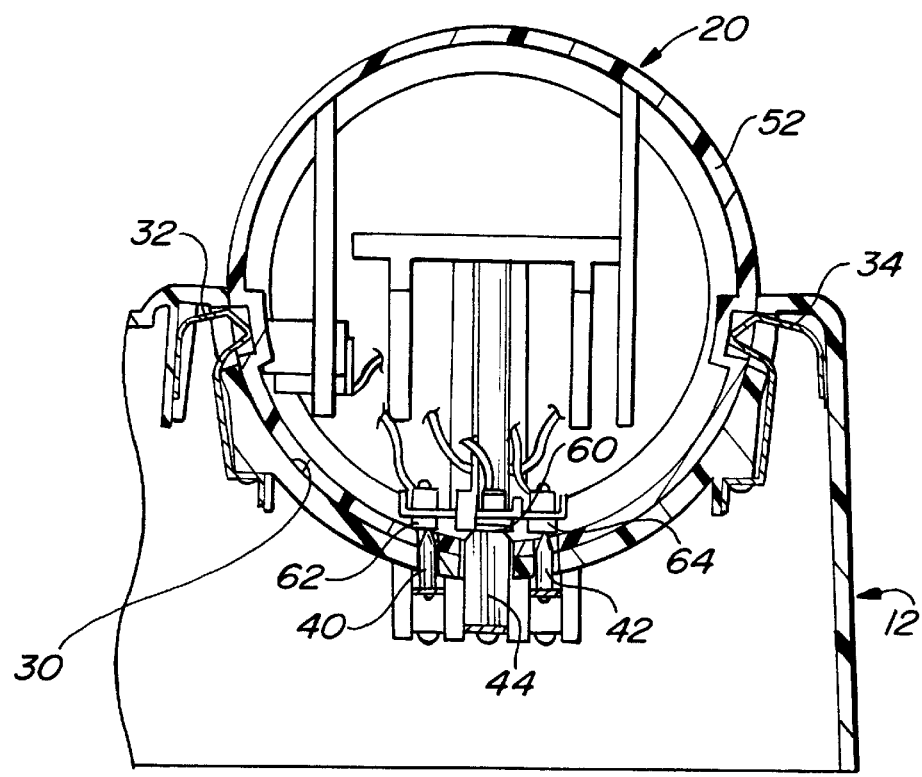

BATTERY AND FLASHLIGHT RECHARGER

BACKGROUND OF THE INVENTION

The present invention relates to a battery charging, and more particularly, to a battery charger which charges an extra or stand alone battery as well as a battery within a flashlight.

Rechargeable batteries systems are well known in the art. Also, rechargeable flashlights to charge the batteries within the flashlight are likewise well known in the art. Several battery recharging systems include housings to place the batteries within the housing to charge the batteries. While these systems are satisfactory for recharging batteries, these systems do not indicate when a power failure or loss is present. Also, these systems do not provide illumination of the charging flashlight when the power failure occurs. Further, these systems only recharge the permanently enclosed rechargeable batteries.

SUMMARY OF THE INVENTION

Accordingly, it is an object of the present invention to provide the art with a battery recharging system which, while AC power is flowing to the charger, enables charging of an extra or stand alone battery as well as a removable battery within a flashlight. The present invention provides indicators to inform the user if one or both batteries are in a charging mode. Also, the invention provides an indicator to inform the user that a power failure is present. Likewise, during a power outage, the flashlight with battery, if connected to the charger, is illuminated so that it is readily available to the user.

In accordance with one aspect of the invention, a battery charger comprises a housing including a receptacle in the housing to receive a stand alone rechargeable battery. Also a receptacle is present in the housing to receive a flashlight, which includes a removable rechargeable battery. A first electrical contact is in the housing to electrically cooperate with the stand alone rechargeable battery. A second electrical contact is present to electrically cooperate with the flashlight to recharge the flashlight battery. The recharger includes a charging circuit. The charging circuit includes a first charging circuit for charging the stand alone battery. The first charging circuit includes an indicator to indicate charging of the battery. A second charging circuit charges the flashlight battery. The second charging circuit includes an indicator to indicate charging of the flashlight battery. The charging circuit also includes a first power outage circuit which includes an indicator to indicate a power loss or outage. A second power outage circuit illuminates the flashlight bulb, when the flashlight with battery, is in the housing, when a power loss occurs.

Additional objects and advantages of the invention will be apparent from the detailed description of the preferred embodiment, appended claims and accompanying drawings, or may be learned by practice of the invention.

BRIEF DESCRIPTION OF THE DRAWINGS

The accompanying drawings, which are incorporated in and constitute a part of the specification, illustrate one embodiment of the invention and together, with the description serve to explain the principles of the invention. In the drawings, the same reference numeral indicate the same parts.

FIG. 3 is a cross-section view through FIG. 1 along line 3—3 thereof.

FIG. 4 is a cross-section view of FIG. 1 along line 4—4 thereof.

DETAILED DESCRIPTION OF THE PREFERRED EMBODIMENT

Figure 1:
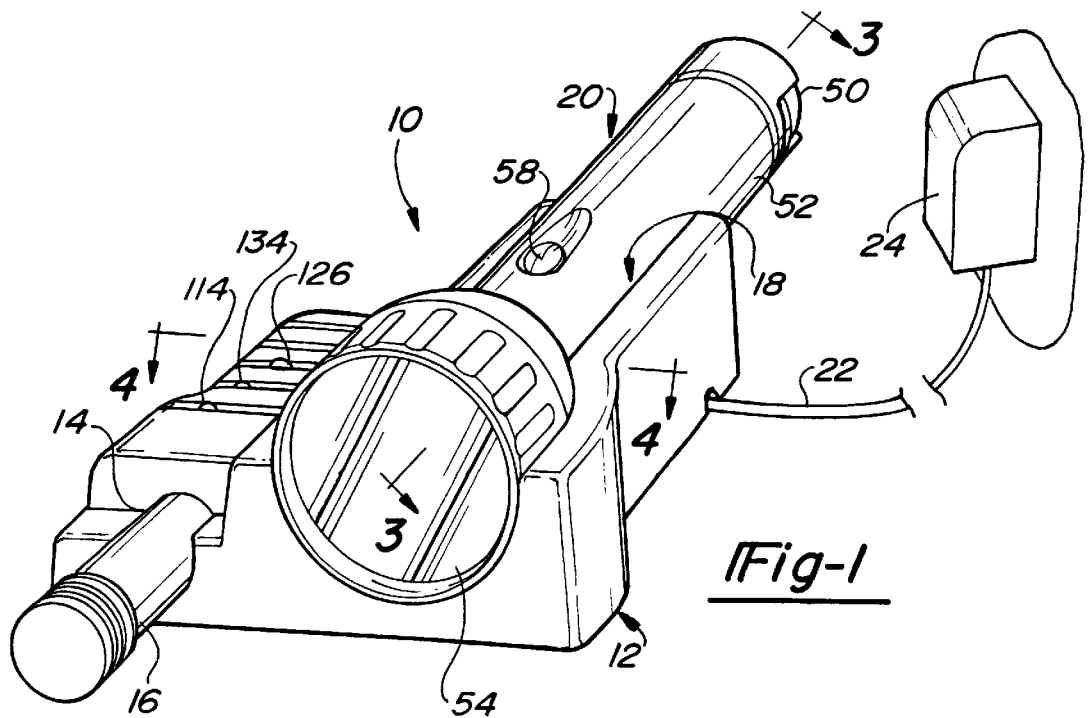
FIG. 1 is a perspective view of a charger system with a flashlight in accordance with the present invention.
Figure 2:
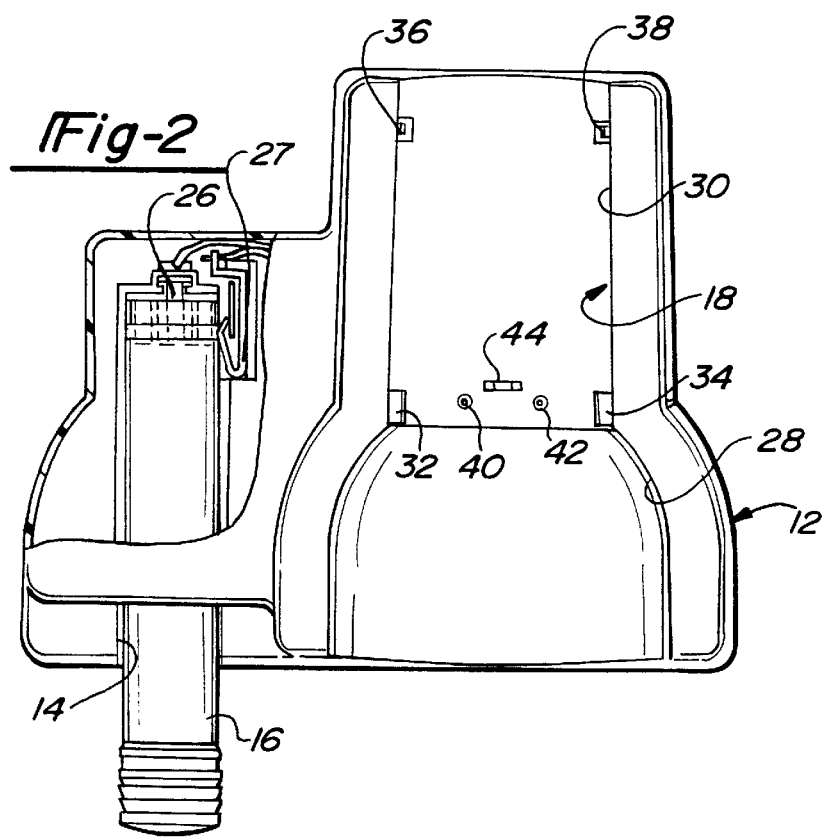
FIG. 2 is a plan view partially in section of the housing of the charger of FIG. 1.

Turning to the FIGS., FIG. 1 illustrates a battery charging system and is designated with the reference numeral 10. The charging system 10 includes a housing 12 which includes a receptacle 14 to receive a stand alone battery 16. The housing 12 also includes a cradle cut out 18 which receives a flashlight 20. A cord 22 which includes a plug 24 connects the charger circuitry (not shown) with an AC power source.

The housing 12 is generally molded from a plastic material. The housing 12 has a desired configuration with the receptacle 14 having an overall circular cross-section to receive a battery 16, like the Versapac™ batteries of the Assignee of the present invention. Electrical connections 26, 27 electrically couples the battery 16 with circuity which will be described herein. The cradle cut out 18 has a configuration to receive the flashlight 20. The cradle cut out 18 normally includes a pair of adjacent arcuate walls 28 and 30. The wall 30 includes a pair of projecting clips 32 and 34 as well as integral clips 36 and 38 all which enable the flashlight 20 to maintain good electrical contact with the charger prong contacts 40, 42 and 44.

The charger prong contacts 40 and 42 are mounted on spring plates and move into the housing wall 30 as the flashlight 20 is inserted into the cutout 18. The charger prong 44 is stationary and pushes on a spring switch 60 in the flashlight 20, to disable the flashlight circuit, as will be described herein.

Three indicator LEDS (114, 126, 134) are positioned on the housing 12. Indicator LED 114 indicates that the stand alone battery 16 is being charged. Indicator LED 134 indicates that the battery 50 in the flashlight 20 is being charged. Indicator LED 126 is illuminated when the AC power has been lost or a power outage is in effect.

The flashlight 20 includes a battery 50, a housing 52, a lens 54, a bulb 56, an on/off switch 58 and circuitry 72. The circuitry 72 includes a spring switch 60, as illustrated in FIG. 3, which contacts the stationary prong 44 to open the flashlight circuitry 72 when the flashlight 20 is in a charging position (See FIG. 5). Also the circuitry 72 includes a pair of contacts 62 and 64 which contact prongs 40 and 42 to charge the battery 50 of the flashlight 20. When power is flowing to the charger 10 and the battery 50 is charging, the indicator LED 134 is illuminated. However, if a power loss or outage occurs, the circuitry, as will be explained herein, of the charger illuminates the bulb 56 of the flashlight 20 so the a user may readily find the flashlight 20 if the flashlight is in the housing 12.

Figure 5:
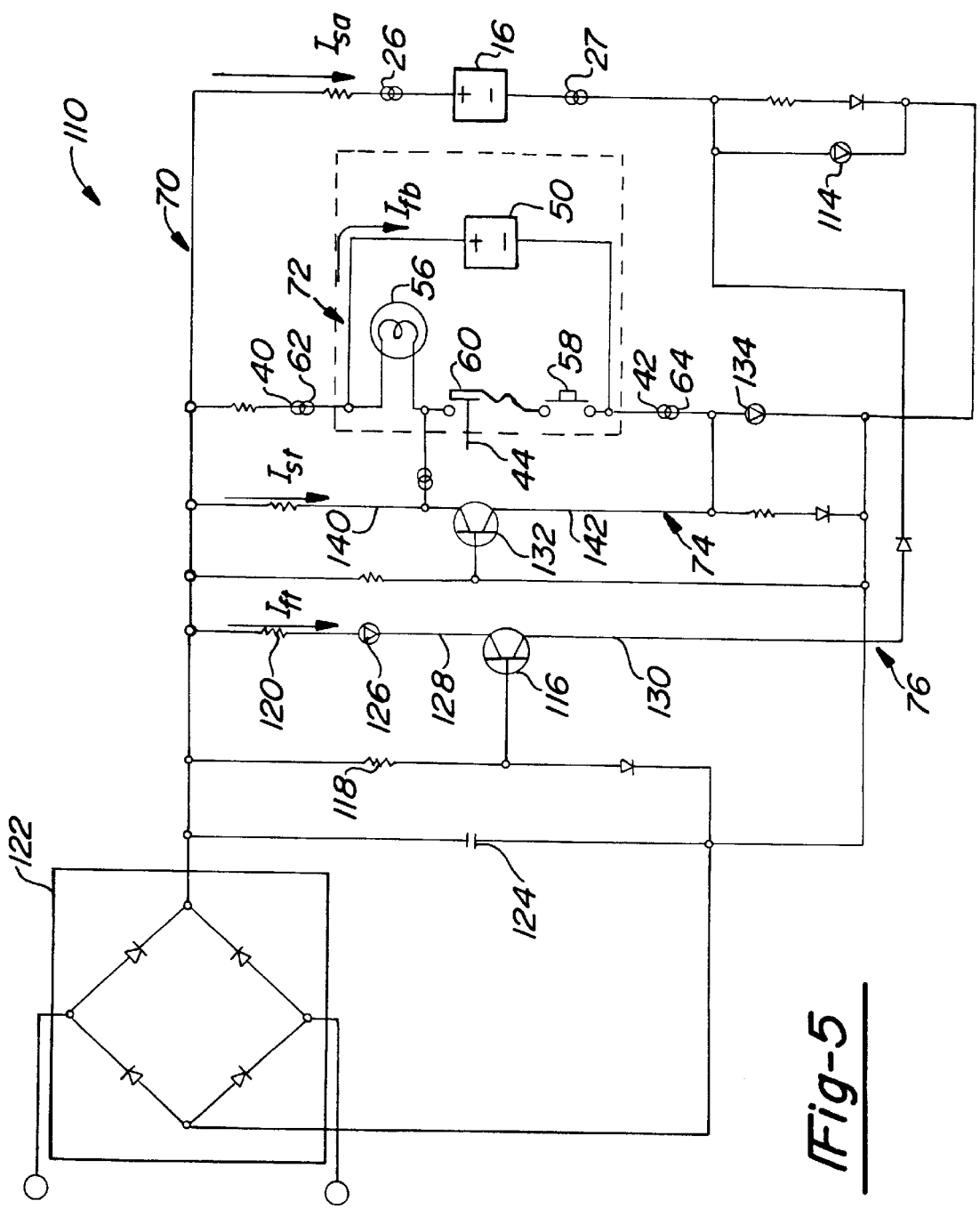
FIG. 5 is a schematic view of the circuitry of the charger system.

Turning to FIG. 5, the overall charging circuit 110 of the present invention is presented. This circuit 110 provides charging of the flashlight battery 50, charging of the stand alone battery 16, automatic activation of the flashlight 20 in the event of a power outage, and an automatic indication that a power failure is present. The overall charging circuit 110 is contained in the previously described charger housing 12, and includes four subsystem circuits 70, 72, 74, 76.

Specifically, the circuit has an extra or stand alone battery charging circuit 70, flashlight battery charging circuit 72, power outage circuit 74, and power outage indication circuit 76. Each of these circuits is in operation based on whether the stand alone battery as well as the flashlight 20 are in their positions and the availability of AC power.

The extra or stand alone battery charging circuit 70 is formed when the stand alone battery 16 is placed in the housing 12 to be charged. In addition to the stand alone battery 16, this circuit 20 includes a resistor 112 that regulates the charging current ($I_{eb}$) presented to the stand alone battery 16, a first indicator light emitting diode (LED) 114 that indicates a charge is in progress, and a first transistor 116.

The first transistor 116 is biased with a first and second resistor (118,120) such that the transistor 116 is off when AC power is presented to a full-wave bridge rectifier 122 and capacitor 124 that form a part of an AC adapter. Because the transistor 116 is biased so that it is off when AC power is available, a stand alone battery charging current ($I_{sa}$ flows through the stand alone battery 16 and first indictor LED 114, thereby charging the stand alone battery 16 and causing the illumination of the first indicator LED 114 to so indicate. However, when AC power is unavailable, the first transistor 16 is turned on, thereby activating the power output indication circuit 76.

The power indication circuit 76 is formed by the first transistor 116, stand alone battery 16, and second indicator LED 126. Because the first transistor 116 is on when AC power is off, a first transistor current ($I_{ft}$) is conducted from the first transistor collector 128 to the first transistor emitter 130, thereby creating a circuit path from the stand alone battery 16 to the second indicator LED 126. This causes the second indicator LED 126 to glow, signaling that AC power is unavailable. It should be noted that due to the significantly low power requirements of an LED, the stand alone battery 16 will retain a charge for a substantial amount of time in the event of a power failure.

As previously described, the presence of the flashlight 20 in the housing 12 breaks the flashlight circuit 72 (i.e. flashlight bulb 56, flash light battery 50, and on/off switch 58). However, placement of the flashlight 20 in the cradle cut out 18 connects a second transistor 132 to the bulb 56 and battery 50 of the flashlight 20, and to a third indictor LED 134.

As with the first transistor 116, the second transistor 132 is biased with two resistors (136,138) such that the second transistor 132 is off when AC power is available. Due to this biasing, the flashlight battery charging circuit 72 is active when AC power is available. The flashlight battery charging circuit 72, which includes the second transistor 132, flashlight battery 50, and third indicator LED 134, has a charging current ($I_{ft}$) that flows through the flashlight battery 50 and third indicator LED 134, thereby charging the flashlight battery 50 and causing the illumination of the third indicator LED 134 to so indicate. However, when AC power is unavailable, the second transistor 132 is turned on, thereby creating the power outage activation circuit 74 which turns the flashlight 20 on while it is in the housing.

Because the second transistor 132 is on when AC power is off, a second transistor current ($I_{st}$) is conducted from the second transistor collector 140 to the second transistor emitter 142, thereby creating a circuit path from the flashlight battery 50 to the flashlight bulb 56, and causing the third indicator LED 134 to turn off and the flashlight bulb 56 to turn on. Therefore, as can be seen, the flashlight battery 50 will be the power source for the flashlight bulb 56 so that the flashlight will generate light in the event of an outage.

Accordingly, when the stand alone battery 16 and the flashlight battery 50 are being charged, the two indicators LEDS 114 and 134 are illuminated. When power has been lost or a outage is present, the indicator 126 is illuminated and is powered by the stand alone battery 16. Also, during the outage, the bulb 56 of the flashlight 20 is likewise illuminated and is powered by the battery 50 within the flashlight 20.

It will be apparent to those skilled in the art that various modifications and variations may be made in the recharging system, the present invention without departing from the scope or spirit of the present invention. Thus, it is intended that the present invention cover these modifications and variations provided and come within the scope of the appended claims and their equivalents.

What is claimed is:

1. A battery charger comprising:
   a housing;
   a first receptacle in said housing for receiving a first rechargeable battery;
   a second receptacle in said housing for receiving a flashlight including a rechargeable battery;
   a first electrical contact for electrically cooperating with said first rechargeable battery;
   a second electrical contact for electrically cooperating with the flashlight rechargeable battery;
   a charging circuit, said charging circuit including:
      a first charging circuit for charging the first battery, said first charging circuit to indicate charging;
      a second charging circuit for charging the flashlight battery, said second charging circuit to indicate charging;
      a first power outage circuit including an indicator to indicate a power loss; and
      a second power outage circuit for illuminating the flashlight bulb when power loss occurs.

2. The battery charger according to claim 1, wherein said first charging circuit includes a visual device to indicate charging of the battery.

3. The battery charger according to claim 1, wherein said second charging circuit includes a visual device to indicate charging of the flashlight battery.

4. The battery charger according to claim 1, wherein said first power outage circuit utilizes said first rechargeable battery as a power source during AC power outages.

5. The battery charger according to claim 1, wherein said second power outage circuit utilizes said flashlight battery to power said flashlight bulb during an AC power outage.

6. The battery charger according to claim 1, wherein said housing includes a bore for receiving said rechargeable battery.

7. The battery charger according to claim 1, wherein said housing includes a cradle portion for receiving said flashlight.

8. The battery charger according to claim 1, wherein said housing includes at least one visual indicator for indicating status of the charger.

9. The battery charger according to claim 8, wherein the visual indicator in said housing is electrically coupled with said first and second charging circuits and said first power outage circuit.

10. A battery charger comprising:
    a housing;
    a receiving bore in said housing for receiving a first rechargeable battery;

a cradle portion in said housing for receiving a flashlight including a rechargeable battery;

a first electrical contact in said receiving bore for electrically cooperating with the first rechargeable battery;

a second electrical contact in said receiving bore for electrically cooperating with the flashlight rechargeable battery;

a charging circuit, said charging circuit including:
- a first charging circuit for charging the first rechargeable battery, said first charging circuit to indicate charging;
- a second charging circuit for charging the flashlight battery, said second charging circuit to indicate charging;
- a first power outage circuit including an indicator to indicate a power loss, said indicator on said housing; and
- a second power outage circuit for illuminating the flashlight light bulb when power loss occurs.

11. The battery charger according to claim 10, wherein said first charging circuit includes a visual device to indicate charging of the first rechargeable battery.

12. The battery charger according to claim 10, wherein said second charging circuit includes a visual device to indicate charging of the flashlight battery.

13. The battery charger according to claim 10, wherein said first power outage circuit utilizes said first rechargeable battery as a power source during AC power outages.

14. The battery charger according to claim 10, wherein said second power outage circuit utilizes said flashlight battery to power said flashlight bulb during an AC power outage.

15. The battery charger according to claim 11, wherein said visual device being a light on said housing.

16. The battery charger according to claim 12, wherein said visual device being a light on said housing.

* * * * *